United States Patent [19]

Miyazaki et al.

[11] Patent Number: 4,931,337
[45] Date of Patent: Jun. 5, 1990

[54] INFORMATION RECORDING MEDIUM

[75] Inventors: Takeshi Miyazaki; Tetsuro Fukui, both of Kawasaki, Japan

[73] Assignee: Canon Kabushiki Kaisha, Tokyo, Japan

[21] Appl. No.: 154,002

[22] Filed: Feb. 9, 1988

[30] Foreign Application Priority Data

Feb. 12, 1987 [JP] Japan .................................. 62-31068

[51] Int. Cl.⁵ ............................................. B32B 3/02
[52] U.S. Cl. ........................................ 428/64; 428/65;
428/413; 428/913; 428/192; 430/394; 430/494;
430/945; 346/76 L; 346/135.1; 369/288; 522/2;
522/31
[58] Field of Search .................. 430/394, 494, 945;
346/76 L, 135.1; 369/288; 428/64, 65, 913, 192,
413; 522/2, 31

[56] References Cited

U.S. PATENT DOCUMENTS

| | | | |
|---|---|---|---|
| 4,548,890 | 10/1985 | Dickinson et al. | 522/31 |
| 4,684,671 | 8/1987 | Tsuchiya et al. | 430/280 |
| 4,688,052 | 8/1987 | Inamoto et al. | 522/102 |
| 4,688,053 | 8/1987 | Noguchi et al. | 522/102 |
| 4,688,056 | 8/1987 | Noguchi et al. | 430/281 |

*Primary Examiner*—Patrick Ryan
*Attorney, Agent, or Firm*—Fitzpatrick, Cella, Harper & Scinto

[57] ABSTRACT

An information recording medium comprises a pair of substrates provided on at least one substrate thereof with a recording layer containing an organic coloring matter, and stuck together by use of an adhesive in such a manner that the substrates may be disposed with the interposition of a space, wherein said substrates of the information recording medium are stuck together by use of an adhesive containing an epoxy monomer and a compound capable of generating a Lewis acid by irradiation with light, and a process for producing the information recording medium.

2 Claims, 1 Drawing Sheet

4,931,337

INFORMATION RECORDING MEDIUM

BACKGROUND OF THE INVENTION

1. Field of the Invention

The present invention relates to an information recording medium, and also it is concerned with a process for preparing an information recording medium.

2. Related Background Art

Organic type optical recording mediums used in the technical field of optical discs or optical cards are provided on a substrate such as glass and plastics, with a heat mode recording layer comprising a spiropyran-containing coloring matter composition, an organic metal and so forth, wherein a beam of light for writing is irradiated on this recording layer to form a pit by removing a part of this recording layer by fusion decomposition or changing the structure of coloring matters, thus recording information in a high density. Regarding the optical recording mediums in which the information thus recorded is read out by detecting the pits with a beam of light for read-out, there have been hitherto proposed those having hollow structure. A typical cross-section thereof is shown in FIG. 1.

In FIG. 1, the numerals 1a and 1b each denote a substrate having a central hole and transparent to laser beams, and made of glass or plastics. The numerals 2a and 2b each denote a recording layer formed into a film on the substrate. In some instances, a very thin subbing layer is laminated beneath the recording layer containing the organic coloring matter that may undergo the fusion decomposition or coloring matter structural change owing to the laser beams, and an auxiliary layer such as a protective layer is laminated on the same. The two substrates 1a and 1b on which the filmy recording layer 2a or 2b was formed are stuck together (adhered) in such a manner that a hollow space 4 is held between them with spacers respectively interposed in the vicinity of an inner peripheral edge and an outer peripheral edge to control the thickness of the hollow space, by use of adhesives 3 and 3' coated in the shape of rings and serving as the spacers. Also well known is an optical information recording medium of air-sandwiched structure in which the information recording layer is provided only on one of the substrate.

As the adhesive used here, there have been developed those of thermosetting types, two-part liquid setting types, moisture curing types, hot-melt types, etc., but most preferred are ultraviolet curing type adhesives that can be quickly cured and have good workability.

However, it is very difficult to effect a 100% complete polymerization by the ultraviolet curing, and the remaining monomers may volatilize in the sealed hollow space to accelerate the deterioration of the recording layer by the interaction with the recording layer.

For this reason, Laid Open Patent Application No. 85643/1986, for example, proposes to add in the recording layer a compound capable of reacting with ultraviolet-curing monomers. However, adding in the recording layer the additive other than the coloring matter has caused the problems such that the sensitivity is lowered because of a decrease in the absorbance of the recording layer or the signal intensity ratio is lowered.

There has also been the problem that, because of a large degree of cure shrinkage of generally available polymerization type adhesives, the stress by strain may remain in the adhered part and there can be achieved no sufficient adhesion to a plastic substrate.

SUMMARY OF THE INVENTION

An object of the present invention is to provide an information recording medium that can solve, without any lowering of recording sensitivity, the problem in the conventional organic type optical recording mediums having the hollow space structure, i.e., the problem that, in instances in which the ultraviolet-curing adhesive is used for adhering the above organic type optical recording mediums, the recording layer comprising the organic coloring matter may be deteriorated because of that adhesive.

According to one aspect of the present invention, there is provided in information recording medium comprising a pair of substrates provided on at least one substrate thereof with a recording layer containing an organic coloring matter, and stuck together by use of an adhesive in such a manner that they may be disposed with the interposition of a space, wherein said substrates of the information recording medium are stuck together by use of an adhesive containing an epoxy monomer and a compound capable of generating a Lewis acid by irradiation with light.

According to another aspect of the present invention, there is provided a process for preparing a information recording medium, which comprises sticking together a pair of substrates provided on at least one substrate thereof with a recording layer containing an organic coloring matter, in such a manner that the substrates may be disposed with the interposition of a space, by use of an adhesive containing an epoxy monomer and a compound capable of generating a Lewis acid by irradiation with light.

Namely, in the cationic polymerization of the above epoxy monomer, the polymerization is initiated by the Lewis acid generated from an onium salt of the Lewis acid at the time of the irradiation with light and, even after termination of the irradiation with light, the polymerization proceeds until the epoxy monomer is substantially completely consumed. Also, since it is not the radical polymerization that takes place in other usual acrylic adhesives, it may not occur that the polymerization stops in part because of inhibition by oxygen in air. Accordingly, the recording layer can be less affected by the volatilization of the monomer, and it is considered that the information recording medium having a good recording sensitivity and suffering no deterioration of the recording layer by the adhesive can be obtained for that reason.

DETAILED DESCRIPTION OF PREFERRED EMBODIMENTS

Figure 1:
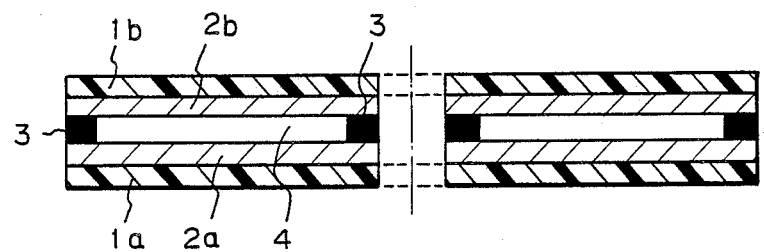
FIG. 1 is a typically illustrated cross-sectional view of an embodiment of the information recording medium according to the present invention.

As the compound of the present invention, which releases a catalyst capable of causing the cationic polymerization of epoxy resin monomers, there can be used, for example, any of onium salts of a Lewis acid, specifically including aromatic diazonium salt complexes of halides and aromatic iodonium salt complexes as disclosed in Macromolecule, Vol. 10, No. 6, pp. 1307–1315 (1977), Photographic Science And Engineering, 18, p. 387 (1974), Japanese Patent Publication No. 14277/1977, Japanese Patent Publication No. 14278/1977 and Japanese Patent Publication No. 14279/1977; aromatic sulfonium salt complexes and aromatic ammonium salt complexes as disclosed in Journal of Polymer Science: Polymer Chemistry Edition, Vol. 22, 1789–1796 (1984); etc.

As Lewis acid anions contained in these salts, there can be used various ones, but, among them, particularly preferable results are obtained when the optical information recording medium is prepared by cure adhesion using as a polymerization catalyst at least one kind of the anions selected from $BF_4^\ominus$, $PF_6^\ominus$, $AsF_6^\ominus$, $SbF_6^\ominus$ and $FeCl_4^{2\ominus}$.

The above onium salt of the Lewis acid may preferably be mixed in the proportion of from 0.1 to 20 parts by weight, more preferably 0.5 to 6 parts by weight, based on the above epoxy monomers.

The reason why $BF_4^\ominus$, $PF_6^\ominus$, $AsF_6^\ominus$, $SbF_6^\ominus$ and $FeCl_4^{2\ominus}$ are particularly preferred as the Lewis acid anions is considered to be that, because of their high catalytic activities, the polymerization may proceed rapidly when they are split off by ultraviolet irradiation, and the volatilization of monomers can be suppressed to the utmost during the curing, so that the recording layer may be little affected.

As cationic polymerization initiators, there can be desirably used those generally known, including diazonium salt, sulfonium salt, iodonium salt and onium salt types, that are so designed as to be thermally stable and have a high sensitivity by masking a strongly acidic catalyst such as Lewis acid at its chemical bond.

The epoxy monomers that can be used include those shown as follows, but are by no means limited to these.

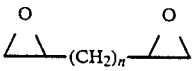

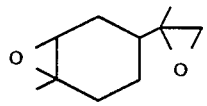

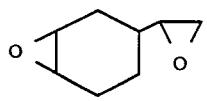

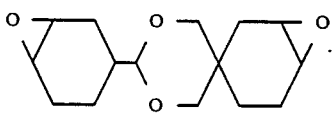

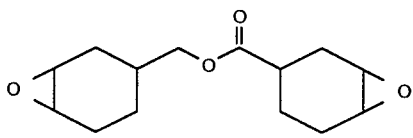

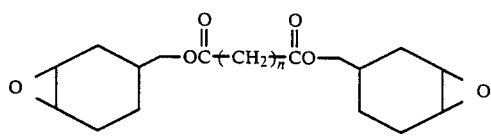

-continued

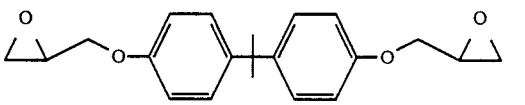

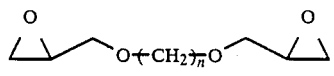

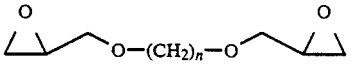

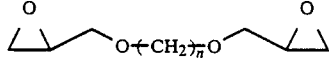

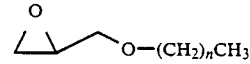

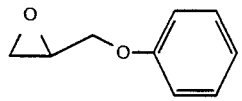

The adhesive may contain, though not an essential component, a reactive diluent in addition to the above monomers, and such diluent that may be contained include butyl glycidyl ether, allyl glycidyl ether, styrene oxide, glycidyl methacrylate, etc. There may be further contained a sensitizer and a stabilizer such as an antioxidant. The substrates for the optical information recording medium, stuck together by any of these epoxy ionic polymerization type adhesives are toughly adhered, and can not peel off during storage. This is presumably because it has shrinkage in a half or less at the time of curing as compared with general acrylic adhesives.

The recording layer used in the present invention contains an organic coloring matter, and typical examples of the organic coloring matter may include cyanine, merocyanine, phthalocyanine, tetrahydrocholine, dioxazine, pyrylium, azulene and anthraquinone type dyes.

In particular, cationic coloring matters typified by cyanine types or polymethine types may not readily undergo the interaction with components (chiefly the monomers) remaining in the adhesive.

As a result of examinations made in further detail, the information recording medium of hollow space structure, hardly affected by the adhesive was obtained specifically in the combination of a cationic coloring matter shown below with the above adhesive.

The cationic coloring matter includes the following:
Polymethine dye represented by Formula (I):

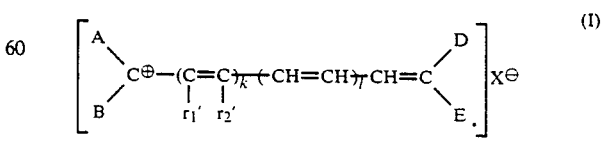

(I)

wherein, A, B, D and E each represent a hydrogen atom or a group selected from an alkyl group having 2 or more carbon atoms, an alkenyl group, an aralkyl group, an aryl group, a styryl group and a heterocyclic group; $r_1'$ and $r_2'$ each represent a group selected from an alkyl group, a cyclic alkyl group, an alkenyl group, an aralkyl group and an aryl group; and k represents 0 or 1; l, 0, 1 or 2; and $X^\ominus$, an anion.

Dye represented by Formula (II):

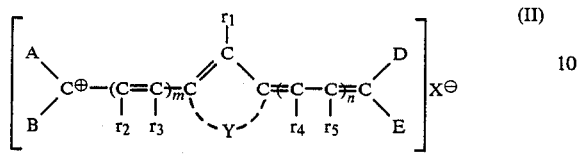

wherein A, B, D, E and $X^\ominus$ each are as defined above; $r_1$ to $r_5$ each represent a hydrogen atom, a halogen atom, an alkyl group or an aryl group; Y represents a divalent residual group having a group of atoms necessary for completing a ring of 5 or 6 members; m and n each represent 0, 1 or 2.

Dye represented by Formula (III):

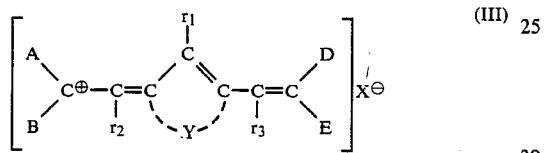

wherein A, B, D, E, $r_2$, $r_3$, Y and $X^\ominus$ are as defined above.

Dye represented by Formula (IV):

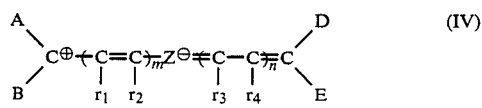

wherein A, B, D, E, $r_1$, $r_2$, $r_3$, $r_4$, m and n are as defined above, and $Z^\ominus$ represents

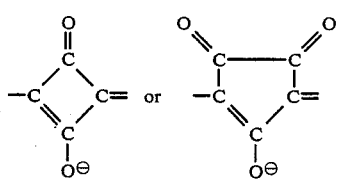

Azulenium dye represented by Formula (V), (VI) or (VII):

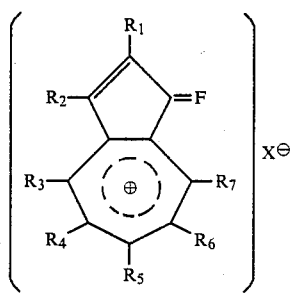

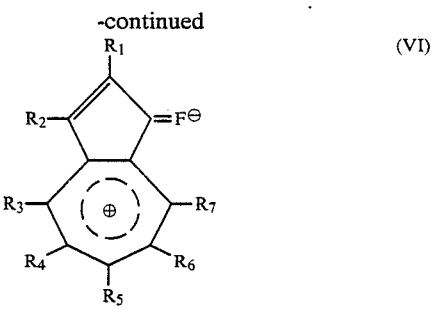

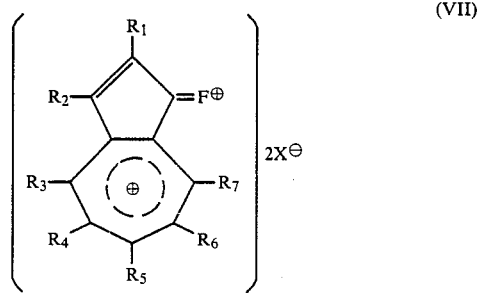

Here, $R_1$ to $R_7$ each represent a hydrogen atom, a halogen atom (including a chlorine atom, a bromine atom and an iodine atom) or a monovalent organic residual group. The monovalent organic group can be selected from the groups covering a wide range.

A substituted or unsubstituted condensed ring may also be formed by at least one combination of the combinations of $R_1$ and $R_2$, $R_2$ and $R_3$, $R_3$ and $R_4$, $R_4$ and $R_5$, $R_5$ and $R_6$ and $R_6$ and $R_7$. The condensed ring includes condensed rings of 5, 6 or 7 members, including aromatic rings (such as benzene, naphthalene, chlorobenzene, bromobenzene, methyl benzene, ethylbenzene, methoxybenzene and ethoxybenzene), heterocyclic rings (such as a furan ring, a benzofuran ring, a pyrol ring, a thiophene ring, a pyridine ring, a quinoline ring and a thiazole ring) and aliphatic rings (such as dimethylene, trimethylene and tetramethylene).

$X^\ominus$ is as defined above and represents an anion.

F represents a divalent organic residual group combined by a double bond. Specific examples in the present invention, containing such F, may include those represented respectively by Formulas (1) to (11). Provided that $Q^\oplus$ in the formula represents an azulenium salt nucleus shown below, and the right side excluding $Q^\oplus$ in the formula indicates F.

Azulenium salt nucleus ($Q^\oplus$):

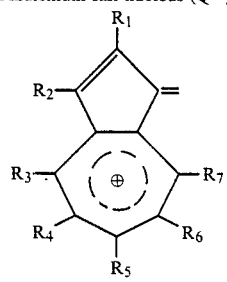

Formula:

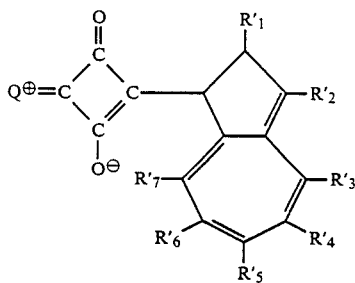 (1)

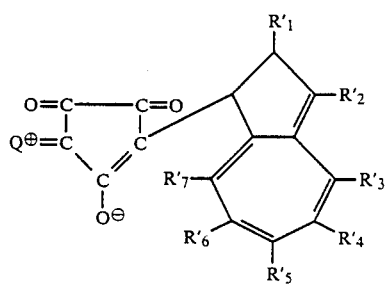 (2)

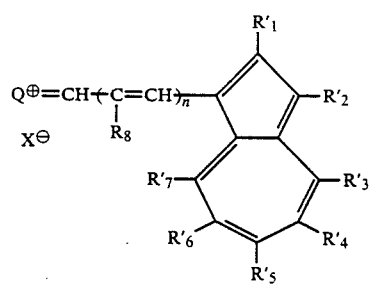 (3)

$R_1'$ to $R_7'$ are as defined for $R_1$ to $R_7$.

Also, the azulenium salt nucleus represented by $Q^\oplus$ and the azulene salt nucleus at the right side in the above Formula (3) may be symmetrical or unsymmetrical.

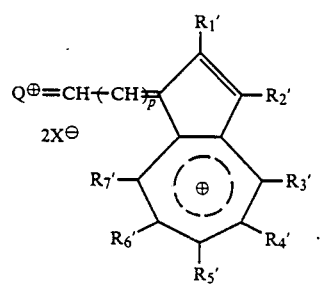 (4)

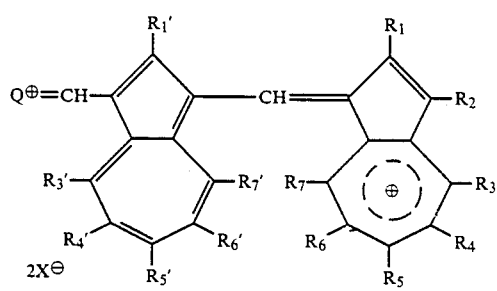 (5)

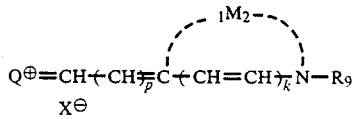 (6)

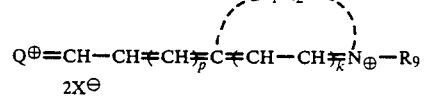 (7)

In the formula, M represents a group of non-metallic atoms necessary for completing a nitrogen-containing heterocyclic ring.

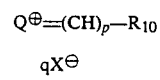 (8)

In the formula, $R_{10}$ represents a substituted or unsubstituted aryl group or a cationic group thereof. P represents an integer of 1 to 8. q is 1 or 2.

 (9)

In the formula, $R_{11}$ represents a heterocyclic group or a cationic group thereof.

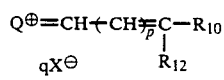 (10)

In the formula, $R_{12}$ represents a hydrogen atom, an alkyl group or a substituted or unsubstituted aryl group.

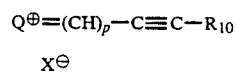 (11)

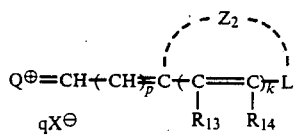 (12)

In the formulas, $Z_2$ represents a group of atoms necessary for completing pyran, thiapyran, selenapyran, telluropyran, benzopyran, benzothiapyran, benzoselenapyran, benzotelluropyran, naphthopyran, naphthothiapyran or naphtoselenapyran or naphthotelluropyran that may be substituted.

L represents a sulfur atom, an oxygen atom, a selenium atom or a tellurium atom.

$R_{13}$ and $R_{14}$ each represent a hydrogen atom, an alkoxyl group, a substituted or unsubstituted aryl group, an aralkenyl group or a heterocyclic group.

Desirable coloring matters include the dyes represented respectively by Formulas (VIII), (IX), (X) and (XI).

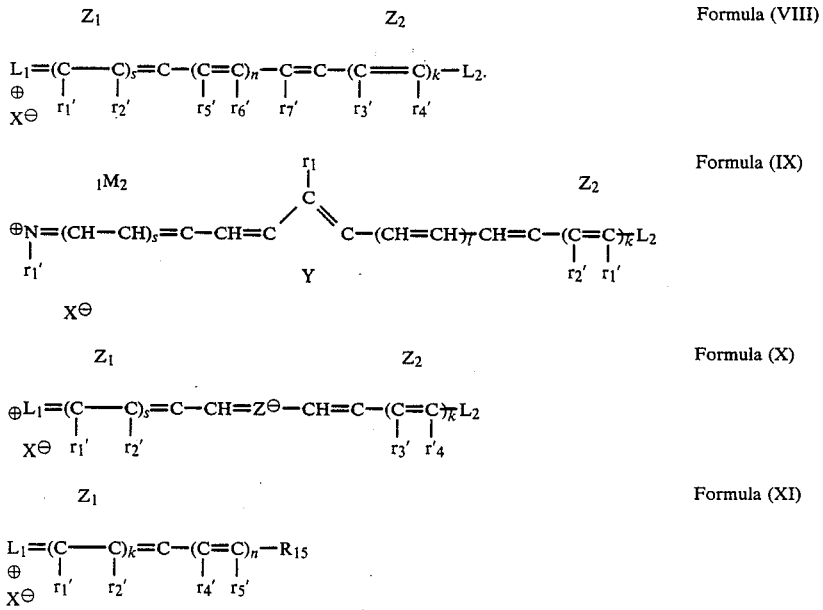

Formula (VIII)

Formula (IX)

Formula (X)

Formula (XI)

In the above Formulas (VIII), (IX), (X) and (XI), $L_1$ and $L_2$ each represent a substituted nitrogen atom, sulfur atom, oxygen atom, selenium atom or tellurium atom; $Z_1$ represents a group of atoms necessary for completing pyrylium, thiopyrylium, selenapyrylium, telluropyrylium, benzopyrylium, benzothiopyrylium, benzoselenapyrylium, benzotelluropyrylium, naphthopyrylium, naphthothiopyrylium, naphthoselenapyrylium or naphthotelluropyrylium that may be substituted; $Z_2$ represents a group of atoms necessary for completing pyran, thiopyran, selenapyran, telluropyran, benzopyran, benzothiopyran, benzoselenapyran, benzotelluropyran, naphthopyran, naphthothiopyran, naphthoselenapyran or naphthotelluropyran that may be substituted. Symbol s is 0 or 1. $R_{15}$ represents a substituted or unsubstituted aryl group or a substituted or unsubstituted heterocyclic group. (Symbols $r_3'$ to $r_7'$ are as defined for $r_1'$ and $r_2'$ described above.)

Symbols k, n, M, $r_1'$, $r_2'$, $r_1$, Y, $Z^\ominus$ and $X^\ominus$ areas defined above.

Symbols in the above formulas will be defined below in greater detail.

A, B, D and E represents a hydrogen atom or an alkyl group (for example, a methyl group, an ethyl group, an n-propyl group, an iso-propyl group, an n-butyl group, a sec-butyl group, an iso-butyl group, a t-butyl group, an n-amyl group, a t-amyl group, an n-hexyl group, an n-octyl group, t-octyl group, etc.), including other alkyl groups, for example, substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, an N-(methylsulfonyl)-carbamylmethyl group, a 3-(acetylsulfamyl)propyl group, a 4-(acetylsulfamyl)butyl group, etc.), cyclic alkyl groups (for example, a cyclohexyl group), an ally group ($CH_2=CH-CH_2-$), alkenyl groups (for example, a vinyl group, a propenyl group, a butenyl group, a pentenyl group, a hexenyl group, a heptenyl group, an octenyl group, a dodecynyl group, a pulenyl group, etc.), aralkyl groups (for example, a benzyl group, a phenytyl group, an α-naphthylmethyl group, a β-naphthylmethyl group, etc.), substituted aralkyl groups (for example, a caboxybenzyl group, a sulfobenzyl group, a hydroxybenzyl group, etc.), etc. $R_1$, $R_2$, $R_3$, $R_4$ and $R_5$ each represent a substituted or unsubstituted aryl group (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group, etc.), a substituted or unsubstituted heterocyclic group (for example, a pyridyl group, a quinolyl group, a lepidyl group, a methylpyridyl group, a furyl group, a thienyl group, an indolyl group, a pyrol group, a carbazolyl group, an N-ethylcarbazolyl group, etc.) or a substituted or unsubstituted styryl group (for example, a styryl group, a methoxystyryl group, a dimethoxystyryl group, a trimethoxystyryl group, an ethoxystyryl group, a dimethylaminostyryl group, a diethylaminostyryl group,l a dipropylaminostyryl group, a dibenzylaminostyryl group, a diphenylaminostyryl group, a 2,2-diphenylvinyl group, a 2-phenyl-2-methylvinyl group, a 2-(dimethylaminophenyl)-2-phenylvinyl group, a 2-(diethylaminophenyl)-2-phenylvinyl group, a 2-(dibenzylaminophenyl)-2-phenylvinyl group, a 2,2-di(diethylaminophenyl)vinyl group, a 2,2-di(methoxyphenyl)vinyl group, a 2,2-di(ethoxyphenyl)vinyl group, a 2-(dimethylaminophenyl)-2-methylvinyl group, a 2-(diethylaminophenyl)-2-ethylvinyl group, etc.

Symbols $r_1'$, $r_2'$, $r_3'$, $r_4'$, $r_5'$, $r_6'$ and $r_7'$ each represent a hydrogen atom or an alkyl group (for example, a methyl group, an ethyl group, an n-propyl group, an iso-propyl group, an n-butyl group, a sec-butyl group, an iso-butyl group, a t-butyl group, an n-amyl group, a t-amyl group, an n-hexyl group, an n-octyl group, t-octyl group, etc.), including other alkyl groups, for example, substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, an N-(methylsulfonyl)-carbamylmethyl group, a 3-(acetylsulfamyl)propyl group, a 4-(acetylsulfamyl)butyl group, etc.), cyclic alkyl groups (for example, a cyclohexyl group), an allyl group (CH$_2$=CH—CH$_2$—), alkenyl groups (for example, a vinyl group, a propenyl group, a butenyl group, a pentenyl group, a hexenyl group, a heptenyl group, an octenyl group, a dodecynyl group, a pulenyl group, etc.), aralkyl groups (for example, a benzyl group, a phenethyl group, an α-naphthylmethyl group, a β-naphthylmethyl group, etc.), substituted aralkyl groups (for example, a carboxybenzyl group, a sulfobenzyl group, a hydroxybenzyl group, etc.), etc. $R_1$, $R_2$, $R_3$, $R_4$ and $R_5$ each represent a substituted or unsubstituted aryl group (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group, etc.); $r_1$, $r_2$, $r_3$, $r_4$ and $r_5$ each represent a hydrogen atom, a halogen atom (such as a chlorine atom, a bromine atom and an iodine atom), an alkyl group (such as methyl, ethyl, n-propyl, iso-propyl, n-butyl, t-butyl, n-amyl, n-hexyl, n-octyl, 2-ethylhexyl and t-octyl), an alkoxy group (such as methoxy, ethoxy, propoxy and butoxy) or a substituted or unsubstituted aryl group (such as phenyl, tolyl, xylyl, ethylphenyl, methoxyphenyl, ethoxyphenyl, chlorophenyl, nitrophenyl, dimethylaminophenyl, α-naphthyl and β-naphthyl). Y represents a divalent hydrocarbon group, for example,

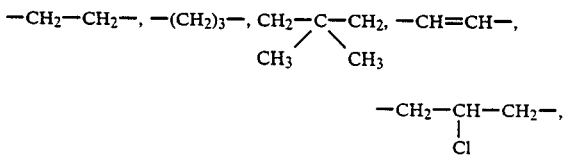

etc., and the 5-membered ring or 6-membered ring of these may be condensed with a benzene ring, a naphthalene ring or the like.

$R_1$ to $R_7$ and $R_1'$ to $R_7'$ each represent an atom or group including a hydrogen atom and a halogen atom (such as a chlorine atom, a bromine atom and an iodine atom), as well as an alkyl group (such as methyl, ethyl, n-propyl, iso-propyl, n-butyl, t-butyl, n-amyl, n-hexyl, n-octyl, 2-ethylhexyl and t-octyl), an alkoxy group (such as methoxy, ethoxy, propoxy and butoxy), a substituted or unsubstituted aryl group (such as phenyl, tolyl, xylyl, ethylphenyl, methoxyphenyl, ethoxyphenyl, chlorophenyl, nitrophenyl, dimethylaminophenyl, α-naphthyl and β-naphthyl), a substituted or unsubstituted aralkyl group (such as benzyl, 2-phenylethyl, 2-phenyl-1-methylethyl, bromobenzyl, 2-bromophenylethyl, methylbenzyl, methoxybenzyl and nitrogenzyl), an acyl group (such as acetyl, propionyl, butyryl, valeryl, benzoyl, tolyloyl, naphthoyl, phthaloyl and furoyl), a substituted or unsubstituted amino group (such as amino, dimethylamino, diethylamino, dipropylamino, acetylamino and benzoyl amino), a substituted or unsubstituted styryl group (such as styryl, dimethylaminostyryl, diethylaminostyryl, dipropylaminostyryl, methoxystyryl, ethoxystyryl and methylstyryl), a nitro group, a hydroxyl group, a carboxyl group, a cyano group or a substituted or unsubstituted arylazo group (such as phenylazo, α-naphthylazo, β-naphthylazo, dimethylaminophenylazo, chlorophenylazo, nitrophenylazo, methoxyphenylazo and tolylazo).

$R_1'$ to $R_7'$ may also form a condensed ring as in the case of $R_1$ to $R_7$.

$R_8$ represents a hydrogen atom, a nitro group, a cyano group, an alkyl group (such as methyl, ethyl group, propyl and butyl) or an aryl group (such as phenyl, tolyl and xylyl).

$R_9$ represents an alkyl group (such as methyl, ethyl, propyl and butyl), a substituted alkyl group (2-hydroxyethyl, 2-methoxyethyl, 2-ethoxyethyl, 3-hydroxypropyl, 3-methoxypropyl, 3-ethoxypropyl, 3-chloropropyl, 3-bromopropyl and 3-carboxypropyl), a cyclic alkyl group (such as cyclohexyl and cyclopropyl), an aryalalkyl group (such as benzyl, 2-phenylethyl, 3-phenylpropyl, 4-phenylbutyl, α-naphtylmethyl and β-naphtylmethyl), substituted aralkyl group (such as methylbenzyl, ethylbenzyl, dimethylbenzyl, trimethylbenzyl, chlorobenzyl and bromobenzyl), an aryl group (such as phenyl, tolyl, xylyl, α-naphthyl and β-naphthyl) or a substituted aryl group (such as chlorophenyl, dichlorophenyl, trichlorophenyl, ethylphenyl, methoxyphenyl, dimethoxyphenyl, aminophenyl, nitrophenyl and hydroxyphenyl).

$R_{10}$ represents a substituted or unsubstituted aryl group (such as phenyl, tolyl, xylyl, biphenyl, α-naphthyl, β-naphthyl, anthranyl, pyrenyl, methoxyphenyl, dimethoxyphenyl, trimethoxyphenyl, ethoxyphenyl, diethoxyphenyl, chlorophenyl, dichlorophenyl, trichlorophenyl, bromophenyl, dibromophenyl, tribromophenyl, ethylphenyl, diethylphenyl, nitrophenyl, aminophenyl, dimethylaminophenyl, diethylaminophenyl, dibenzylaminophenyl, dipropylaminophenyl, morpholinophenyl, piperidinylphenyl, piperazinophenyl, diphenylaminophenyl, acetylaminophenyl, benzoylaminophenyl, acetylphenyl, benzoylphenyl and cyanophenyl).

$R_{11}$ represents a monovalent heterocyclic group derived from a heterocyclic ring such as furan, thiophene, benzofuran, thionaphthene, dibenzofuran, carbazole, phenothiazine, phenoxazine or pyridine.

$R_{12}$ represents a hydrogen atom, an alkyl group (such as methyl, ethyl, propyl and butyl) or a substituted or unsubstituted aryl group (such as phenyl, tolyl, xylyl, biphenyl, ethylphenyl, chlorophenyl, methoxyphenyl, ethoxyphenyl, nitrophenyl, aminophenyl, dimethylaminophenyl, diethylaminophenyl, acetylaminophenyl, α-naphthyl, β-naphthyl, anthralyl and pyrenyl).

$R_{13}$ and $R_{14}$ represents a hydrogen atom, an alkyl group (such as methyl, ethyl, propyl and butyl), an alkoxy group (such as methoxy, ethoxy, propoxy, ethoxyethyl and methoxyethyl), an aryl group (such as phenyl, tolyl, xylyl, chlorophenyl, biphenyl and methoxyphenyl), a substituted or unsubstituted styryl group (such as styryl, p-methoxystyryl, o-chlorostyryl and p-methoxystyryl), a substituted or unsubstituted 4-phenyl-1,3-butadienyl group (such as 4-phenyl-1,3-butadienyl and 4-(p-methylphenyl)-1,3-butadienyl) or a substituted or unsubstituted heterocyclic ring (such as quinolyl, pyridyl, carbazolyl and furyl).

M represents a group of atoms necessary for completing a nitrogen-containing heterocyclic ring such as pyridine, thiazole, benzothiazole, naphthothiazole, oxazole, benzoxazole, naththoxazole, imidazole, benzimidazole, naphthoimidazole, 2-quinoline, 4-quinoline, isoquinoline or indole, and may be substituted with a halogen atom (such as a chlorine atom, a bromine atom and an iodine atom), an alkyl group (such as methyl, ethyl, propyl and butyl), an aryl group (such as phenyl, tolyl and xylyl) or an aralkyl group (such as benzyl and p-tolylmethyl).

Symbols $r_1'$ to $r_7'$ reach represent a hydrogen atom, a substituted or unsubstituted alkyl group (such as methyl, ethyl, propyl, isopropyl, butyl, t-butyl, amyl, isoamyl, hexyl, octyl, nonyl, dodecyl, methoxyethyl, hydroxyethyl and carboxypropyl), a substituted or unsubstituted aryl group (such as phenyl, α-naphthyl, β-naphthyl, tolyl, xylyl, biphenyl, ethylphenyl, methoxyphenyl, ethoxyphenyl, dimethoxyphenyl, hydroxyphenyl, chloroxyphenyl, dichlophenyl, bromophenyl, dibromophenyl, nitrophenyl, diethylaminophenyl, dimethylaminophenyl and dibenzylaminophenyl), a substituted or unsubstituted aralkyl group (such as benzyl, phenetyl, 3-phenylpropyl, methoxybenzyl, methylbenzyl and chlorobenzyl).

Symbols k and s each are 0 or 1, and l, m, n each are 1 or 2.

$X^\ominus$ is an anion, representing a chloride ion, a bromide ion, an iodide ion, a perchlorate ion, a benzenesulfonate ion, a p-toluenesulfonate ion, a methylsulfate ion, an ethylsulfate ion, a propylsulfate ion, a tetrafluoroborate ion, a tetraphenylborate ion, a hexafluorophosphate ion, a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a monohydrogendiphosphate ion, a dihydrogenmonophosphate ion, a pentachlorostanate ion, a chlorosulfonate ion, a fluorosulfonate ion, a trifluoromethanesulfonate ion, a hexanefluoroantimonate ion, a molybdate ion, a tungstate, a titanate ion, a zirconate ion, or the like.

Examples of these coloring matters are shown in Table 1, but by no means limited to these. When $Z^\ominus$ is

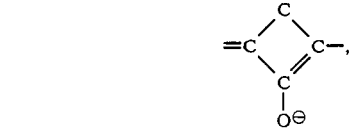

this is indicated as $Za^\ominus$, and when $Z^\ominus$ is

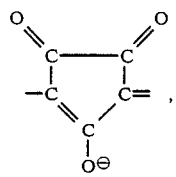

this is indicated as $Za^\ominus$.

TABLE 1

| No. | Formula | A | B | C | D | E | r₁' | r₂' | X |
|-----|---------|---|---|---|---|---|-----|-----|---|
| 1 | (I) | ph | ↓ | ↓ | ↓ | — | — | $BF_4$ | k=0, l=1 |
| 2 | (I) | $(CH_3)_2N$–C₆H₄– | ph | $(CH_3)_2N$–C₆H₄– | ph | — | — | $ClO_4$ | k=0, l=1 |
| 3 | (I) | $(CH_3)_2N$–C₆H₄– | ↓ | $(C_2H_5)_2N$–C₆H₄– | ↓ | — | — | $BF_4$ | k=0, l=1 |
| 4 | (I) | $(C_2H_5)_2N$–C₆H₄– | ph | $(C_2H_5)_2N$–C₆H₄– | ph | H | $CH_3$– | $ClO_4$ | k=1, l=0 |
| 5 | (I) | $(C_2H_5)_2N$–C₆H₄– | ↓ | $(C_2H_5)_2N$–C₆H₄– | ↓ | — | — | $ClO_4$ | k=0, l=1 |
| 6 | (I) | $(C_2H_5)_2N$–C₆H₄– | 4-$C_2H_5O$–C₆H₄– | $(C_2H_5)_2N$–C₆H₄– | 4-$C_2H_5O$–C₆H₄– | — | — | $ClO_4$ | k=0, l=1 |
| 7 | (I) | $(C_2H_5)_2N$–C₆H₄– | 2,4-di-$CH_3$-3-$CH_3$-C₆H₃– | $(C_2H_5)_2N$–C₆H₄– | 2,4-di-$CH_3$-3-$CH_3$-C₆H₃– | — | — | $ClO_4$ | k=0, l=1 |
| 8 | (I) | $(C_2H_5)_2N$–C₆H₄– | ↓ | $(CH_3)_2N$–C₆H₄– | ↓ | H | $CH_3$– | $BF_4$ | k=1, l=0 |

TABLE 1-continued
| | | | | | | | | |
|---|---|---|---|---|---|---|---|---|
| 9 | (I) | 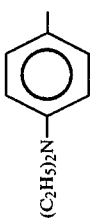 (C₂H₅)₂N— | 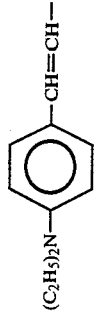 CH₃OC₂H₄ | H | 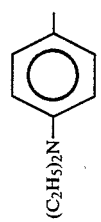 (C₂H₅)N— —CH=CH— | ↓ 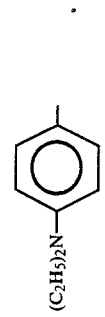 CH₃OC₂H₄ | — | — | ClO₄ | k=0, l=0 |
| 10 | (I) |  (C₂H₅)₂N— | CH₃— | 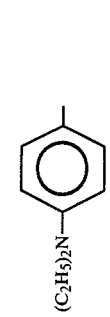 (C₂H₅)₂N— | ↓ | CH₃ | H | ClO₄ | k=1, l=0 |
| 11 | (I) | 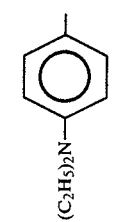 N-pyrrolidine | ↓ | 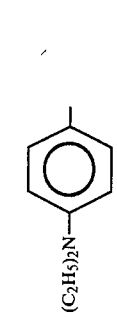 (C₂H₅)₂N— | ↓ | — | — | ClO₄ | k=0, l=1 |
| 12 | (I) | 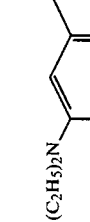 (C₂H₅)₂N— | 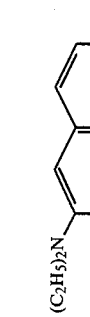 naphthyl | 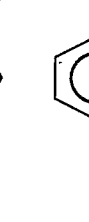 (C₂H₅)₂N— | 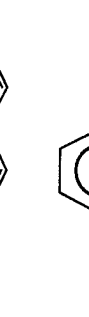 naphthyl | H | —C₂H₅ | BF₄ | k=1, l=0 |
| 13 | (I) | 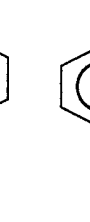 (C₂H₅)₂N— naphthyl | CH₃— | 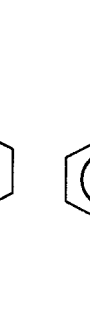 (C₂H₅)N— naphthyl | CH₃— | — | — | ClO₄ | k=0, l=1 |
| 14 | (I) | 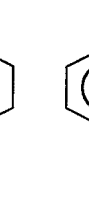 (C₂H₅)₂N— | CH₃— |  (C₂H₅)₂N— | CH₃— | — | — | ClO₄ | k=0, l=1 |
| 15 | (I) | (CH₃)₂N— | CH₃— | (CH₃)₂N— | CH₃— | H | CH₃ | ClO₄ | k=0, l=1 |
| 16 | | (CH₃)₂N— | C₃H₇— | (CH₃)₂N— | C₃H₇— | — | — | ClO₄ | k=1, l=0 |

TABLE 1-continued

| For-mula No. | A | B | D | E | r1 | r2 | r3 | r4 | r5 | X | Y | |
|---|---|---|---|---|---|---|---|---|---|---|---|---|
| 17 (I) | (CH₃)₂N—⌬—CH₃ | | (CH₃)₂N—⌬ | (CH₃)₂N—⌬—CH₃ | | | | | | | ClO₄ | k = 0, l = 1 |
| 18 (I) | (CH₃)₂N—⌬ | | ⌬O (furan) | (CH₃)₂N—⌬ | | | | | | | ClO₄ | k = 0, l = 1 |
| 19 (II) | CH₃O—⌬ | ↓ | ↓ | ↓ | H | — | — | — | — | Cl | —(CH₂)₃— | m = 1, n = 0 |
| 20 (II) | (CH₃)₂N—⌬ | ph | (CH₃)₂N—⌬ | ph | H | — | — | — | — | ClO₄ | —(CH₂)₃— | m = 0, n = 0 |
| 21 (II) | (CH₃)₂N—⌬ | ph | (CH₃)₂N—⌬ | ph | H | — | — | — | — | ClO₄ | —CH₂CCH₂— with two CH₃ | m = 0, n = 0 |
| 22 (II) | (C₂H₅)₂N—⌬ | ↓ | ↓ | ↓ | H | — | — | — | — | ClO₄ | —CH₂CCH₂— with two CH₃ | m = 0, n = 0 |
| 23 (II) | (CH₃)₂N—⌬ | ↓ | morpholino-⌬ | ↓ | H | — | — | — | — | ClO₄ | —(CH₂)₃— | m = 0, n = 0 |
| 24 (II) | (C₂H₅)₂N—⌬ | ↓ | ↓ | ↓ | H | — | — | — | — | BF₄ | o-xylylene (CH₂-C₆H₄-CH₃) | m = 0, n = 0 |

TABLE 1-continued

| No. | Formula | Ar₁ | R₁ | Ar₂ | R₂ | R₃ | R₄ | R₅ | Anion | Linker | m, n, Z |
|---|---|---|---|---|---|---|---|---|---|---|---|
| 25 | (II) | 4-(pyrrolidin-1-yl)phenyl | H | 4-(pyrrolidin-1-yl)phenyl | H | — | — | — | ClO₄ | —(CH₂)₂— | m = 0, n = 0 |
| 26 | (II) | 4-(CH₃)₂N-phenyl | C₂H₅O | 4-(CH₃)₂N-phenyl | C₂H₅O | H | — | — | ClO₄ | —(CH₂)₂— | m = 0, n = 0 |
| 27 | (II) | 4-(CH₃)₂N-phenyl | CH₃ | ↓ | CH₃ | Cl | H | — | ClO₄ | —(CH₂)₃— | m = 1, n = 1 |
| 28 | (III) | ↓ | ↓ | — | ↓ | Cl | H | — | ClO₄ | —(CH₂)₃— | |
| 29 | (III) | ↓ | ↓ | — | ↓ | H | CH₃ | CH₃ | ClO₄ | —CH₂—C(CH₃)₂—CH₂— | |
| 30 | (III) | 4-(CH₃)₂N-phenyl | C₂H₅O | 4-(CH₃)₂N-phenyl | C₂H₅O | Cl | H | — | ClO₄ | —(CH₂)₃— | |
| 31 | (IV) | ph | ↓ | — | ↓ | H | — | — | — | — | m = n = 1, Z = Za |
| 32 | (IV) | ↓ | ↓ | — | ↓ | — | — | — | — | — | m = n = 0, Z = Za |
| 33 | (IV) | ↓ | ↓ | — | ↓ | H | CH₃ | CH₃ | — | — | m = n = 2, Z = Zb |

TABLE 1-continued

| No. | Formula | F | X | | | | | |
|---|---|---|---|---|---|---|---|---|
| 34 | (IV) | | | (CH₃)₂N—⟨ph⟩— | ⟨ph⟩—OC₂H₅ | (CH₃)₂N—⟨ph⟩— | ⟨ph⟩—OC₂H₅ | — | m = n = 0, Z = Zb |
| 35 | (IV) | | | (C₂H₅)₂N—⟨ph⟩— | ⟨ph⟩—CH₃ | (CH₃)₂N—⟨ph⟩— | ⟨ph⟩—CH₃ | H | m = n = 1, Z = Zb |
| 36 | (IV) | | | ⟨ph⟩— | ph | ⟨ph⟩— | ↓ | ↓ | m = n = 0, Z = Za |
| 37 | (IV) | | | (C₂H₅)₂N—⟨ph⟩— | ph | (CH₃)₂N—⟨ph⟩— | ph | — | m = n = 0, Z = Zb |
| 38 | (IV) | | | ⟨ph-N(CH₃)-pyrrolidine⟩ | ph | ⟨ph-N(CH₃)-pyrrolidine⟩ | ph | — | m = n = 0, Z = Za |

| No. | Formula | F | X | |
|---|---|---|---|---|
| 39 | (V) | (3) | ClO₄ | R₁ = R₃ = R₅ = R₆ = R'₁ = R'₃ = R'₅ = R'₆ = H, R₂ = R₇ = R'₂ = R'₇ = CH₃, R₄ = R'₄ = CH(CH₃)₂, R₈ = NO₂, n = 1 |
| 40 | (V) | (3) | ClO₄ | R₁ = R₃ = R₅ = R₆ = R'₁ = R'₃ = R'₅ = R'₆ = H, R₂ = R₇ = R'₂ = R'₇ = CH₃, R₄ = R'₄ = CH(CH₃)₂, R₈ = H, n = 2 |
| 41 | (V) | (3) | I | R₁ = R₃ = R₆ = R'₁ = R'₃ = R₄ = R'₆ = H, R₅ = R₇ = R'₅ = R'₇ = CH₃, R'₂, R₃, R'₃ are cyclized with n = 0 —(CH₂)— |
| 42 | (V) | (3) | ClO₄ | R₁ = R₂ = R₃ = R₄ = R₅ = R₆R₇ = R'₁ = R'₂ = R'₃ = R'₄ = R'₅ = R'₆ = R'₇ = R₈ = H, n = 2 |
| 43 | (V) | (3) | ClO₄ | R₁ = R₅ = R₆ = R'₁ = R'₆ = R₈ = R'₂ = R'₃ = R'₄ = R₆ = R'₇ = H, R₃ = R₇ = CH₃, R₄ = CH(CH₃)₂, R'₅ = C(CH₃)₃, n = 2 |
| 44 | (VII) | (4) | ClO₄ | R₁ = R₃ = R₅ = R₆ = H, R₂ = R₄ = R₇ = CH₃, R₄ = CH(CH₃)₂, p = 1 |
| 45 | (VIII) | (4) | I | R₁ = R₂ = R₄ = R₆ = H, R₃ = R₅ = R₇ = CH₃, p = 1 |
| 46 | (VII) | (4) | ClO₄ | R₁ = R₃ = R₅ = R₆ = H, R₂ = NO₂, R₄ = CH(CH₃)₂, p = 3 |
| 47 | (VI) | (1) | — | R₁ = R₃ = R₅ = R₆ = R₇ = H, R₂ = R₄ = CH(CH₃)₂ |
| 48 | (VI) | (1) | — | R₁ = R₅ = R₆ = R₇ = H, R₂ == CH₃, R₃ and R₄ are combined to form —S—CH=C(CH₃)— |
| 49 | (VI) | (1) | — | R₁ = R₂ = R₄ = R₆ = R₇ = H, R₃ = R₇ = CH₃, R₅ = -ph |
| 50 | (VI) | (2) | — | R₁ = R₃ = R₄ = R₆ = H, R₂ = R₇ = CH₃, R₄ = CH(CH₃)₂ |
| 51 | (VI) | (2) | — | R₁ = R₂ = R₄ = R₆ = H, R₃ = R₇ = CH₃, R₅ = OC₂H₅ |
| 52 | (VII) | (5) | ClO₄ | R₁ = R₃ = R₅ = R₆ = H, R₂ = R₇ = CH₃, R₄ = CH(CH₃)₂, R'₁ = R'₃ = R'₅ = R'₆ = R'₇ = H |
| 53 | (VII) | (5) | ClO₄ | R₁ = R₂ = R₃ = R₄ = R₇ = H, R'₁ = R'₃ = R'₅ = R'₆ = H, R₅ = n-C₈H₁₇ |

TABLE 1-continued
| | | | | |
|---|---|---|---|---|
| 54 | (V) | (6) | ClO₄ | $R_1 = R_3 = R_5 = R_6 = H, R_2 = R_7 = CH_3, R_4 = CH(CH_3)_2, R_9 = C_2H_5$<br>$k = 0, p = 5$ | 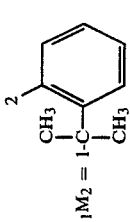 $_1M_2 = 1-\overset{CH_3}{\underset{CH_3}{C}}-$ |
| 55 | (V) | (6) | ClO₄ | $R_1 = R_3 = R_5 = R_6 = H, R_2 = R_7 = R_9 = CH_3, R_4 = CH(CH_3)_2$<br>$k = 1, p = 3$ | 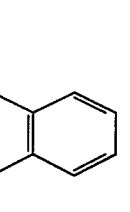 $_1M_2 = $ |
| 56 | (VII) | (7) | BF₄ | $R_1 = R_3 = R_5 = R_6 = H, R_2 = R_7 = CH_3, R_4 = CH(CH_3)_2, R_9 = C_2H_5$<br>$k = 0, p = 5$ | 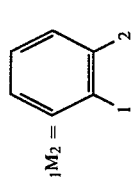 $_1M_2 = 1-S-$ |
| 57 | (VII) | (7) | ClO₄ | $R_1 = R_3 = R_5 = R_6 = H, R_2 = R_7 = CH_3, R_4 = CH(CH_3)_2$<br>$k = 0, p = 5$ | 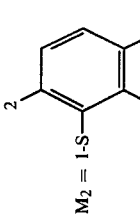 $_1M_2 = 1-S-$ |
| 58 | (V) | (8) | ClO₄ | $R_1 = R_2 = R_4 = R_6 = H, R_3 = R_7 = CH_3, R_2 = OC_2H_5$<br>$p = 5, q = 1$ | 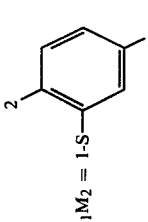 $R_{10} = $ |
| 59 | (VII) | (8) | ClO₄ | $R_1 = R_3 = R_5 = R_6 = H, R_2 = R_7 = CH_3, R_4 = CH(CH_3)_2$<br>$p = 6, q = 2$ | 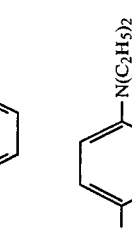 $R_{10} = $ |

TABLE 1-continued

| | | | | |
|---|---|---|---|---|
| 60 | (V) | ClO₄ | (9) | $R_1 = R_3 = R_5 = R_6 = H$, $R_2 = R_7 = 0$ $CH_3$, $R_4 = CH(CH_3)_2$ <br> $p = 5$, $q = 1$ | $R_{11} =$ 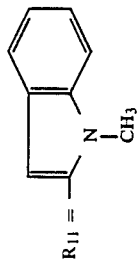 |
| 61 | (VII) | ClO₄ | (9) | $R_1 = R_3 = R_4 = R_6 = R_7 = H$, $R_5 = n\text{-}C_8H_{17}$ <br> $p = 4$, $q = 2$ | $R_{11} =$ 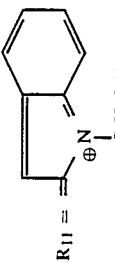 |
| 62 | (V) | BF₄ | (9) | $R_1 = R_3 = R_6 = H$, $R_2 = R_7 = CH_3$, $R_4$ and $R_5$ are combined to form <br> $-S-CH=C(CH_3)-$ $p = 5$, $q = 1$ | $R_{11} =$ 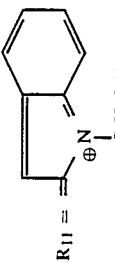 |
| 63 | (V) | ClO₄ | (10) | $R_1 = R_3 = R_5 = R_6 = H$, $R_2 = R_7 = CH_3$, $R_4 = CH(CH_3)_2$ <br> $p = 4$, $q = 1$ | $R_{10} = R_{12} =$ 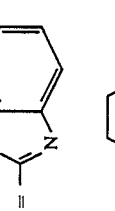 |
| 64 | (VII) | ClO₄ | (10) | $R_1 = R_3 = R_5 = R_6 = H$, $R_2 = R_7 = CH_3$, $R_4 = CH(CH_3)_2$ <br> $p = 3$, $q = 2$ | $R_{10} =$ 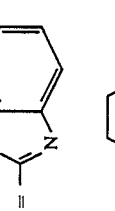 |
| 65 | (V) | ClO₄ | (11) | $R_1 = R_3 = R_5 = R_6 = H$, $R_2 = R_7 = CH_3$, $R_4 = CH(CH_3)_2$ <br> $p = 3$ | $R_{10} =$ 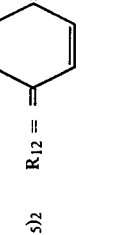 $R_{12} =$ 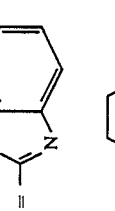 |
| 66 | (V) | ClO₄ | (12) | $R_1 = R_3 = R_5 = R_6 = H$, $R_2 = R_7 = CH_3$, $R_4 = CH(CH_3)_2$ <br> $p = 3$, $q = 1$, $k = 0$, $L = S$ | $Z_{12} = -CH=C-CH=C-$ <br> with ph, ph substituents |
| 67 | (V) | ClO₄ | (12) | $R_1 = R_2 = R_4 = R_6 = R_{13} = H$, $R_3 = R_5 = R_7 = CH_3$, $R_{14} = ph$ <br> $p = 3$, $q = 1$, $k = 1$, $L = Te$ | $Z_{12} = -CH=C-$ with ph |
| 68 | (VII) | ClO₄ | (12) | $R_1 = R_3 = R_5 = R_6 = H$, $R_{13} = H$, $R_2 = R_7 = CH_3$, $R_4 = CH(CH_3)_2$, $R_{14} = ph$ <br> $p = 2$, $q = 2$, $k = 1$, $L = Te^{\oplus}$ | $Z_{12} = -CH=C-$ with ph |

TABLE 1-continued
| | | | | |
|---|---|---|---|---|
| 77 (X) | — | ph<br>—C=CH— | ph<br>—CH=C— | $L_1 = L_2 = S, r_1 = r_4 = ph, r'_2 = r'_3 = H, Z = Z_b$<br>$S = k = 1$<br>$R_{15} =$ 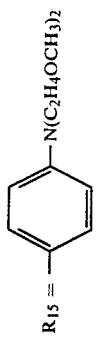 |
| 78 (XI) | ClO$_4$ | ph<br>—C=CH— | — | $L_1 = Te, r_1 = ph, r'_2 = r'_4 = r'_5 = H$<br>$n = 2, k = 1$<br>$R_{15} =$ 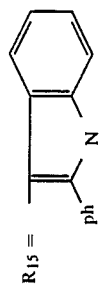 |
| 79 (XI) | ClO$_4$ | ph ph<br>—C=CH—C=CH— | — | $L_1 = S, r'_4 = r'_5 = H$<br>$n = 2, k = 0$<br>$R_{15} =$  |
| 80 (XI) | ClO$_4$ | ph<br>—C=CH— | — | $L_1 = S, r'_1 = ph, r'_2 = r'_4 = r'_5 = H$<br>$n = 2, k = 1$ |

A process for preparing the information recording medium according to the present invention will be described below.

The information recording medium according to the present invention can have, for example, the hollow structure as shown in FIG. 1. The information recording medium having a hollow space 4b shown in FIG. 1 are formed by forming recording layers 2a and 2b comprising the organic dye selected from the compounds having the structure represented by any of the above Formulas (I) to (XI), and thereafter being so stuck together that the recording layer 2a and 2b may face each other, by use of an adhesive 3 containing the above-described epoxy monomer and the compound capable of generating a Lewis acid by irradiation with light.

In the formation of the recording layers 2a and 2b, two or more kinds of the organic dyes represented respectively by the above Formulas (I) to (XI) can be used in combination, and there may also be mixed and dispersed, or laminated a layer of, other dyes including, for example, dyes other than the compounds of the above Formulas (I) to (XI), of the type of aminium salt or diimonium salt metallic chelate complexes of polymethine type, azulene type, pyrylium type, squalium type, croconium type, triphenylmethane type, xanthene type, anthraquinone type, cyanine type, phthalocyanine type, dioxazine type, tetrahydrocholine type, triphenothiazine type or phenathlene type triarylamine compounds; or metals, metallic compounds or the like, for example, Al, Te, Bi, Sn, In, Se, SnO, TeO$_2$, As, Cd, etc.

The compounds of the above Formulas (I) to (XI) may be contained in a binder in a state that they are dispersed or dissolved in a binder.

There can be used, for example, cellulose esters such as nitrocellulose, cellulose phosphate, cellulose sulfate, cellulose acetate, cellulose propionate, cellulose butyrate, cellulose myristate, cellulose palmitate, cellulose acetate propionate and cellulose acetate butyrate; cellulose ethers such as methyl cellulose, ethyl cellulose, propyl cellulose and butyl cellulose; vinyl resins such as polystyrene, polyvinyl chloride, polyvinyl acetate, polyvinyl butyral, polyvinyl acetal, polyvinyl alcohol and polyvinyl pyrrolidone; copolymer resins such as a styrene/butadiene copolymer, a styrene/acrylonitrile copolymer, a styrene/butadiene/acrylonitrile copolymer and a vinyl chloride/vinyl acetate copolymer; acrylic resins such as polymethyl methacrylate, polymethyl acrylate, polybutyl acrylate, polyacrylic acid, polymethacrylic acid, polyacrylamide and polyacrylonitrile; polyesters such as polyethylene terephthalate; polyacrylate resins such as poly(4,4'-isopropylidenediphenilene-co-1,4-cyclohexylenedimethylene carbonate), poly(ethylenedioxy-3,3'-phenylene thiocarbonate), poly(4,4'-isopropylidenediphenilene carbonate-co-terephthalate), poly(4,4'-isopropylidenediphenilene carbonate), poly(4,4'-sec-butyridenediphenylene carbonate) and poly(4,4'-isopropylidenediphenilene carbonate-block-oxyethylene); or polyamides, polyimides, epoxy resins, phenol resins, polyolefins such as polyethylene, polypropylene and chlorinated polyethylene, etc.

The recording layers 2a and 2b may also contain surface active agents, antistatic agents, stabilizers, dispersants, flame-retardants, lubricants, plasticizers, etc. Also, as the organic solvent that can be used when the recording layers are provided by coating, though variable depending on whether the above compounds are used in a dispersed state or a dissolved state, there can be used, in general, alcohols such as methanol, ethanol, isopropanol and diacetone alcohol; ketones such as acetone, methyl ethyl ketone and cyclohexanone; amides such as N,N-dimethylformamide; sulfoxides such as dimethylsulfoxide; ethers such as tetrahydrofuran, dioxane, and ethylene glycol monomethyl ether; esters such as methyl acetate, ethyl acetate and butyl acetate; aliphatic hydrocarbon halides such as chloroform, methylene chloride, dichloroethylene, carbon tetrachloride and trichloroethylene; aromatics such as benzene, toluene, xylene, monochlorobenzene and dichlorobenzene or aromatic hydrocarbons such as n-hexane, cyclohexane and ligroin; etc.

The coating can be carried out by using coating methods such as dip coating, spray coating, spinner coating, beat coating, Meyer bar coating, blade coating, roller coating and curtain coating.

The recording layers 2a and 2b may have a dry thickness or deposited thickness of from 50 Å to 100 μm, particularly desirably from 200 Å to 1 μm.

As the substrate 1, there can be used plastics such as polyester, acrylic resin, polyolefine resin, phenol resin, epoxy resin, polyamide and polyimide; and glass or metals; etc.

Figure 2:
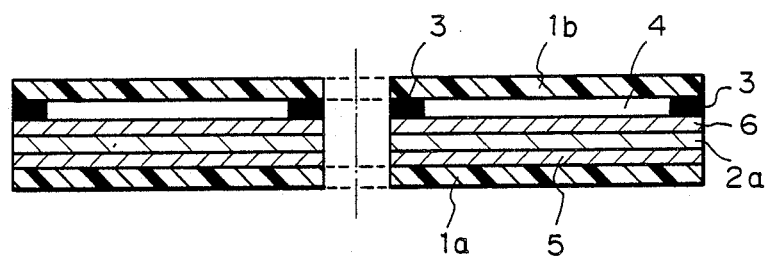
FIG. 2 is a typically illustrated cross-sectional view of another embodiment of the information recording medium according to the present invention.

The information recording medium according to the present invention can also be prepared to have the construction that subbing layers 5 and/or protective layers 6 are provided as shown in FIG. 2.

The subbing layers are provided for the purpose of;
 (a) improving the adhesion;
 (b) providing a barrier to water, gas, or the like;
 (c) improving the storage stability of the recording layers;
 (d) improving the reflectance;
 (e) protecting the substrates from solvents;
 (f) forming pregrooves; etc.

With regard to the purpose (a), there can be used polymeric materials, for example, a variety of materials such as ionomer resins, polyamide resins, vinyl type resins, natural macromolecules, silicone and liquid rubber. With regard to the purposes (b) and (c), there can be used, in addition to the above polymeric materials, inorganic compounds, for example, $SiO_2$, $MgF_2$, SiO, $TiO_2$, ZnO, TiN, SiN, etc., metals or semi-metals, for example, Zn, Cu, S, Ni, Cr, Ge, Se, Cd, Ag, Al, etc. With regard to the purpose (d), there can be used metals, for example, Al, Ag, etc., or organic thin film of, for example, azulene dyes, methine dyes, etc. having a metallic gloss. And, with regard to the purposes (e) and (f), there can be used ultraviolet curing resins, thermosetting resins, thermoplastic resins, etc. The subbing layer may appropriately have a film thickness of from 50 Å to 100 μm, preferably from 200 Å to 30 μm.

The protective layers are provided for the purposes of protection from scratch, dust, soil, etc., improving the storage stability of the recording layers and improving the reflectance, and the materials that can be used therefor are the materials same as those for the subbing layers. The protective layer may appropriately have a film thickness of at least 50 Å, preferably at least 200 Å.

In this occasion, the above compounds of the above Formulas (I) to (XI) of the present invention may be contained in the subbing layer and/or the protective layer. The subbing layer and/or the protective layer may also contain stabilizers, dispersants, flame retardants, lubricants, antistatic agents, surface active agents, plasticizers, etc.

In the present invention, it is possible to carry out the recording on the recording layers comprised of the organic coloring matter by irradiation with a gas laser beam such as an argon laser beam (oscillation wavelength: 488 nm), a helium/neon laser beam (oscillation wavelength: 633 nm), a helium/cadmium laser beam (oscillation wavelength: 442 nm), etc, but more suitable is a method in which the recording is carried out by irradiation with a laser beam preferably having an oscillation wavelength of 750 nm or more, in particular, a laser beam having the oscillation wavelength at the near infrared or infrared region, such as a gallium-/aluminum/arsenic semiconductor laser beam (oscillation wavelength: 830 nm). For carrying out the reading, the above laser beams can also be used. Here, the writing and reading can be carried out with use of laser beams having the same wavelength, or can be carried out with use of laser beams having the different wavelength.

In the present invention, there is no limitation in the shape of the information recording medium, and there may be included, for example, a disc or a card.

The information recording medium and the process for preparing the same can bring about the effect as follows:

(1) The coloring matter used in the recording layers is not affected by the adhesive, so that the recording and-/or reproducing can be stably carried out and also there is less deterioration of the recording and/or reproducing performance(s) also during storage.

(2) The adhesive can also exhibit a good adhesion performance, causing no peeling in the information recording medium during storage.

In the following, parts are by weight.

EXAMPLE 1

On a disk-like transparent polycarbonate substrate of 130 mm in outer diameter, 15 mm in inner diameter and 1.2 mm in thickness, an organic coloring matter (No. 5 in Table 2) was applied by spinner coating with a thickness of 1000 Å to make a recording layer.

This substrate was prepared in two pieces, which were stuck together and sealed with spacers (0.5 mm) interposed therebetween in the shape of rings at the inner peripheral part and outer peripheral part as shown in the drawings, using an adhesive.

The adhesive used had the composition shown below.

| | |
|---|---|
| Diglycidyl ether of bisphenol A (Trade name: DER-331, available from Dow Chemical Co.) | 95 parts |
| Diphenyliodium hexafluorophosphate | 5 parts |

Using a high pressure mercury lamp as a light source, ultraviolet rays (80 mW/cm) was irradiated for 30 seconds. On the resulting disc, continuous irradiation (reproduction) was carried out using a semiconductor laser beam of 830 nm in wavelength, while rotating the disc at 1800 rpm, with a beam diameter of 1 μm and laser power of 0.9 mW, at the position of 40 mm in track radius to measure how many times the reproduction was able to be performed before the reflectance fell to 75% of the initial stage. This disc was also left for 2,000 hours in an environment of 60° C. and 90% RH to examine the change in reflectance and the peeling of the stuck substrates of the disc.

EXAMPLES 2 to 15

Example 1 was repeated but using adhesives having the composition shown in Table 2 and using organic coloring matters shown therein, to prepare discs to carry out the measurement of irradiation times and the environmental tests.

TABLE 2

| Example | Composition of adhesive Ionic polymerization catalyst (5 parts) | Epoxy monomer (95 parts) | Oraganic coloring matter (No. in Table 2) |
|---|---|---|---|
| 2 | diphenyliodonium $PF_6^-$ (I⊕PF$_6^\ominus$) | DER-331 | 2 |
| 3 | " | " | 6 |
| 4 | p-nitrophenyldiazonium $AsF_6^-$ (N⊕≡N–C$_6$H$_4$–NO$_2$, AsF$_6^\ominus$) | " | 5 |
| 5 | diphenyliodonium $BF_4^-$ (I⊕BF$_4^\ominus$) | " | 5 |

TABLE 2-continued

| Example | Composition of adhesive Ionic polymerization catalyst (5 parts) | Epoxy monomer (95 parts) | Oraganic coloring matter (No. in Table 2) |
|---|---|---|---|
| 6 | " | " | 59 |
| 7 | " | " | 26 |
| 8 | " | " | 29 |
| 9* | 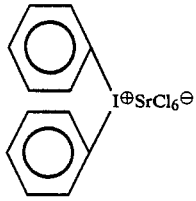 I⊕SrCl₆⊖ | " | 5 |
| 10 | 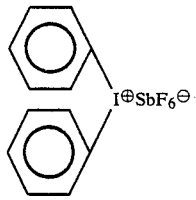 I⊕SbF₆⊖ | " | 78 |
| 11 | 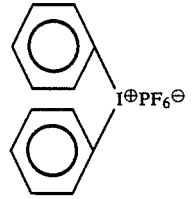 I⊕PF₆⊖ | " | 34 |
| 12 | 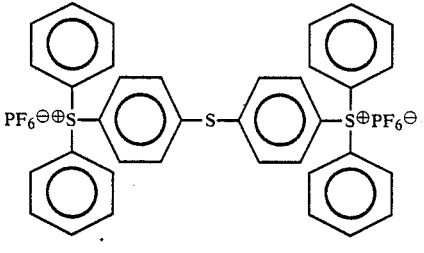 PF₆⊖S⊕—⟨⟩—S—⟨⟩—S⊕PF₆⊖ | " | 40 |
| 13 | " | " | 47 |
| 14 | " | " | 72 |
| 15 | " | " | 43 |

*For complete cure, it was required to irradiate ultraviolet rays (80 mW/cm) for 60 seconds. Others were completely cured by irradiation for 30 seconds.

COMPARATIVE EXAMPLES 1 TO 4

Example 1 was repeated but using commercially available adhesives shown below, to prepare discs to carry out the measurement of irradiation times and the environmental tests.

Comparative Example 1: 570
(Oligoacrylate type; available from Toho Chemical Industry Co., Ltd.)
Comparative Example 2: 3033
(Urethane acrylate type; available from Three Bond Co., Ltd.)
Comparative Example 3: UV1000
(Acrylic type; available from Sony Chemicals Corp.)
Comparative Example 4: UV1005
(Epoxy acrylate type; available from Sony Chemicals Corp.)

Results obtained in the above are shown in Table 3.

TABLE 3

| | Initial Stage | Enviromental test (2,000 hr, 60° C. 90% RH) | |
|---|---|---|---|
| | Reproduction times | Reflectance (%) | Reflectance (%) | Peeling in disc |
| Example 1 | 10⁵ or more | 16.8 | 16.4 | No |
| Example 2 | " | 18.6 | 18.0 | " |
| Example 3 | " | 17.2 | 16.9 | " |
| Example 4 | " | 16.8 | 16.1 | " |
| Example 5 | " | 16.8 | 16.2 | " |
| Example 6 | " | 17.8 | 15.1 | " |
| Example 7 | " | 17.4 | 17.0 | " |
| Example 8 | " | 16.5 | 16.4 | " |

TABLE 3-continued

| | Reproduction times | Initial Stage Reflectance (%) | Enviromental test (2,000 hr, 60° C. 90% RH) Reflectance (%) | Peeling in disc |
|---|---|---|---|---|
| Example 9 | " | 16.8 | 16.2 | " |
| Example 10 | " | 23.0 | 22.0 | " |
| Example 11 | " | 19.0 | 18.5 | " |
| Example 12 | " | 21.0 | 20.1 | " |
| Example 13 | " | 22.1 | 20.9 | " |
| Example 14 | " | 22.0 | 20.9 | " |
| Example 15 | " | 20.6 | 18.9 | " |
| Comparative Example 1 | 2000 | 16.8 | 13.2 | Yes |
| Comparative Example 2 | 1500 | 16.8 | 13.7 | " |
| Comparative Example 3 | 1000 or less | 16.8 | 14.1 | " |
| Comparative Example 4 | 1000 or less | 16.8 | 13.0 | " |

*Times of the reproduction that was able to be performed by continuous irradiation before the reflectance fell to 75% of the initial stage.

I claim:

1. An information recording medium, comprising: a pair of substrates, at least one of said substrates having a recording layer containing a cationic organic coloring matter, said cationic organic coloring matter having the formula

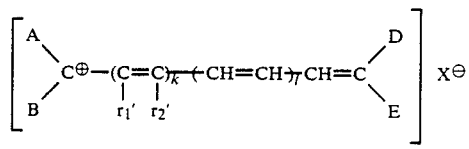

wherein A, B, D and E are independently hydrogen or selected from the group consisting of alkyl, alkenyl, substituted or unsubstituted aralkyl, substituted or unsubstituted aryl, substituted or unsubstituted styryl and a substituted or unsubstituted heterocyclic group; $r_1'$ and $r_2'$ are independently alkyl, cyclic alkyl, alkenyl group, substituted or unsubstituted aralkyl or aryl; k represents 0 or 1; l represents 0–2; and $X^-$ is an anion, said substrates being adhered together with an adhesive thereby defining a space interposed therebetween, wherein said adhesive contains an epoxy monomer and a compound capable of generating a Lewis acid by irradiation with light.

2. The information recording medium of claim 1, wherein said compound capable of generating a Lewis acid is an onium salt, the ionic species thereof being selected from $BF_4^\ominus$, $PF_6^\ominus$, $AsF_6^\ominus$, $SbF_6^\ominus$ and $FeCl_4^{2\ominus}$.

* * * * *